US006831569B2

(12) United States Patent
Wang et al.

(10) Patent No.: US 6,831,569 B2
(45) Date of Patent: Dec. 14, 2004

(54) METHOD AND SYSTEM FOR ASSIGNING AND BINDING A NETWORK ADDRESS OF A BALLAST

(75) Inventors: Ling Wang, Ossining, NY (US); Ihor Wacyk, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 489 days.

(21) Appl. No.: 09/802,104

(22) Filed: Mar. 8, 2001

(65) Prior Publication Data

US 2002/0126020 A1 Sep. 12, 2002

(51) Int. Cl.[7] .............................................. G08C 19/00
(52) U.S. Cl. ................................. 340/825.52; 340/3.5
(58) Field of Search ............................. 340/325.5, 52, 340/310.01, 310.06, 825.69, 825.72, 825.21, 3.5, 3.52; 315/149, 291, 294, 312, 317; 370/449, 463; 362/251, 394; 710/9, 4

(56) References Cited

U.S. PATENT DOCUMENTS

| | | | | |
|---|---|---|---|---|
| 4,523,128 A | | 6/1985 | Stamm et al. ............... 315/291 |
| 4,847,834 A | * | 7/1989 | Bryant ........................ 370/449 |
| 5,160,924 A | * | 11/1992 | Conil et al. ............. 340/825.52 |
| 5,352,957 A | * | 10/1994 | Werner ........................ 315/291 |
| 5,866,992 A | * | 2/1999 | Geiginger et al. ..... 340/825.52 |
| 6,174,073 B1 | * | 1/2001 | Regan et al. ................ 362/251 |

OTHER PUBLICATIONS

Patent Abstracts of Japan, Togusa Kenji, "Address Setting Device For Air Conditioner For Air Conditioning Equipment," Publication No. 03244954, Oct. 31, 1991, Application No. 02042156, Feb. 22, 1990.

* cited by examiner

Primary Examiner—Michael Horabik
Assistant Examiner—William Bangachon

(57) ABSTRACT

A system for implementing a method for initializing and binding ballasts is disclosed. The system comprises a remote control having a master controller and the ballasts each having a slave controller. The master controller and the slave controllers are operated to implement routines whereby the master controller generates a clock sequence of a plurality of clock cycles, and the slave controllers randomly generate addresses and direct a transmission of signals indicative of the generated random addresses to the master controller during corresponding clock cycles. In response thereto, the master controller assigns network addresses corresponding to the random addresses as indicated by the corresponding clock cycles. The master controller and the slave controllers are further operated to implement routines for verifying the assigned network addresses and routines for binding each network address to a command of the remote control.

15 Claims, 13 Drawing Sheets

| NETWORK ADDRESSES | BOUND COMMANDS |
|---|---|
| $NA_1$ | ON, OFF |
| $NA_2$ | ON, OFF |
| $NA_3$ | ON, DIM, OFF |
| $NA_4$ | DIM, OFF |
| $NA_5$ | ON, OFF |
| $NA_6$ | ON, OFF |
| $NA_7$ | ON, OFF |
| $NA_8$ | ON, OFF |

FIG. 13

METHOD AND SYSTEM FOR ASSIGNING AND BINDING A NETWORK ADDRESS OF A BALLAST

BACKGROUND OF THE INVENTION

1. Field of the Invention

The present invention generally relates to wireless control of lighting fixtures and lamps. The present invention specifically relates to the assigning and binding of network addresses of ballasts within the fixtures and lamps.

2. Description of the Related Art

Currently, there are infrared wireless control systems and radio frequency wireless control systems for allowing a user to control an operation of a lighting fixture or lamp without the use of a light switch wired directly to the fixture or lamp. Typically, such systems include a remote control having a transmitter and a ballast within each fixture or lamp, each ballast having a receiver. A user operates the remote control to transmit operating commands to a particular receiver of a selected ballast whereby an operation of the selected ballast is controlled. To be able to individually and collectively control each ballast within a cell, each receiver is identified by a unique address that is pre-set within the receiver during a manufacture of the ballast. As such, after an installation of the ballasts within the cell, each receiver must be bound to a specific button or key of the remote control whereby a user of the remote control can selectively operate a selected ballast.

A binding method known in the art involves operating the transmitter of the remote control to transmit a command to all of the receivers whereby each receiver is set in a special mode for binding. Second, the transmitter is operated to transmit a request for the pre-set address of one of the receivers within the cell. Third, upon a receipt of the pre-set address, a specific button or key of the remote control is bound to the corresponding receiver. The second and third steps are repeated for each receiver.

The effectiveness of the aforementioned binding method is based on two premises. The first premise is that each receiver has a unique address that is pre-programmed in the factory. Thus, it is imperative that the ballasts within a cell include receivers that are manufactured from a single manufacturer or a collective group of multiple manufacturers. However, under such circumstances, decorative and operational choices of a user become limited to deciding among systems as opposed to deciding among individual fixtures or lamps from various systems. Additionally, each pre-set address must contain a significant amount of bits in order to be unique.

The second premise is that the transmitter can transmit a command to one of the receivers within the cell without other receivers, within or without the cell, receiving the command to thereby avoid multiple reactions to the command. However, a radio frequency is omni-directional and can penetrate objects. Thus, all receivers within a transmission range of the radio frequency signal will receive the signal. The transmission range must then be reduced or focused to purposely enable a solo communication between the transmitter and an individual receiver. Such a reduction or focusing of the transmission range however limits the convenience and use of binding each receiver to the remote control.

It is therefore desirable to improve upon prior art methods of binding ballasts to a remote control.

SUMMARY OF THE INVENTION

The present invention relates to a method and system for initializing and binding ballasts that overcomes the disadvantages associated with the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

A first form of the present invention is an operating method of a remote control for assigning a network address to a ballast installed within a cell. The remote control transmits a signal indicative of a start of a clock sequence including a plurality of clock cycles to the ballast. The remote control assigns a network address to the ballast in response to receiving second signal from the ballast during one of the clock cycles.

A second form of the present invention is an operating method of a ballast installed within a cell for receiving an assignment of a network address. The ballast generates a random address as a function of a plurality of clock cycles. The ballast transmits a signal indicative of the random address during one of the clock cycles in response to a reception of a signal indicating a start of a clock sequence including the clock cycles.

A third form of the present invention is a method for operating a remote control and a ballast installed within a cell. The ballast generates a random address as a function of a plurality of clock cycles. The remote control transmits a signal indicative of a start of a clock sequence including the clock cycles. The ballast transmits a signal indicative of the random address during one the clock cycles in response to a reception of the start clock sequence signal. The remote control assigns a network address to the ballast in response to a reception of the random address signal.

A fourth form of the present invention is a computer readable medium including a computer program product for assigning a network address to a ballast installed within a cell. The computer program product comprises the following computer readable codes. A computer readable code for generating a clock sequence of a plurality of clock cycles. And, a computer readable code for assigning a network address to the ballast in response to a reception of signal during one of the clock cycles.

A fifth form of the present invention is a computer readable medium including a computer program product for receiving an assignment of a network address. The computer program product comprises the following computer readable codes. A computer readable code for generating a random address as a function of a plurality of clock cycles. And, a computer readable code for transmitting a signal indicative of the random address during one the clock cycles in response to a signal indicating a start of a clock sequence including the clock cycles.

A sixth form of the present invention is a system comprising a cell, a ballast installed with the cell, and a remote control. The ballast is operable to generate a random address as a function of a plurality of clock cycles. The remote control is operable to transmit a signal indicative of a start of a clock sequence including the clock cycles. The ballast is further operable to transmit a signal indicative of the random address during one the clock cycles in response to a reception of the start clock sequence signal. The remote control is further operable to assign a network address to the ballast in response to a reception of the random address signal.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 13 is an exemplary mapping of network addresses and commands of the FIG. 1B remote control during an implementation of the FIG. 11 master binding routine and the FIG. 12 slave binding routine.

DETAILED DESCRIPTION OF THE PRESENTLY PREFERRED EMBODIMENTS

Figure 1A:
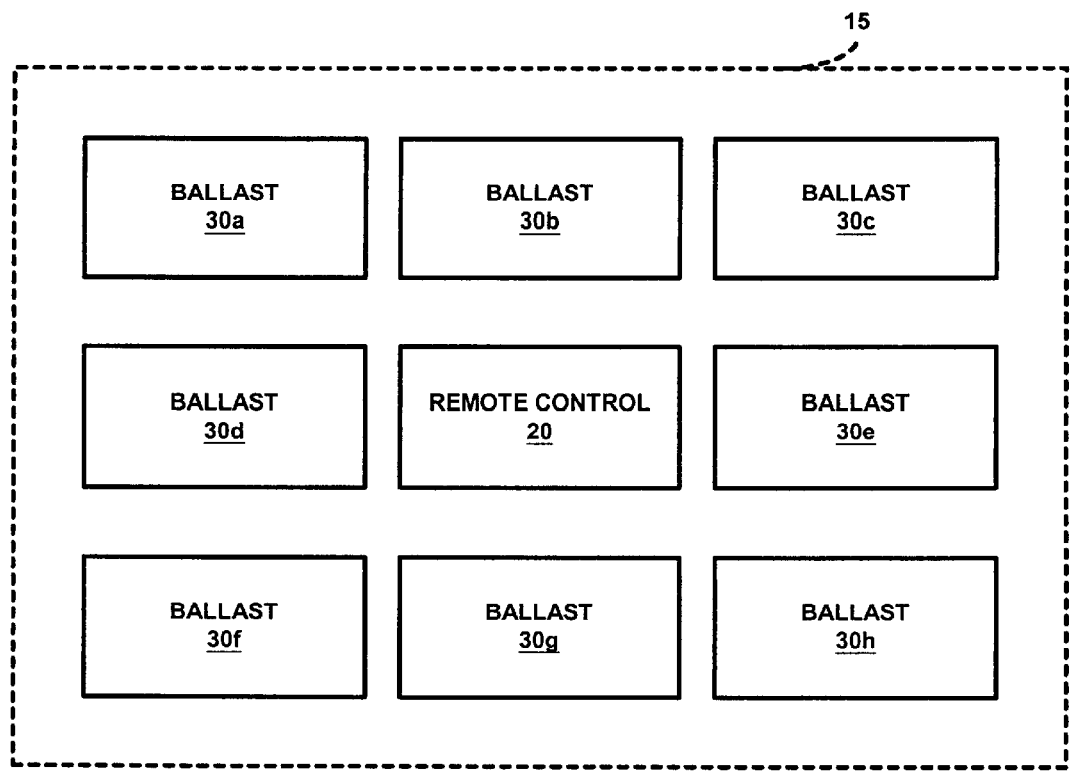
FIG. 1A is a block diagram of a cell in accordance with one embodiment of the present invention.
Figure 1B:
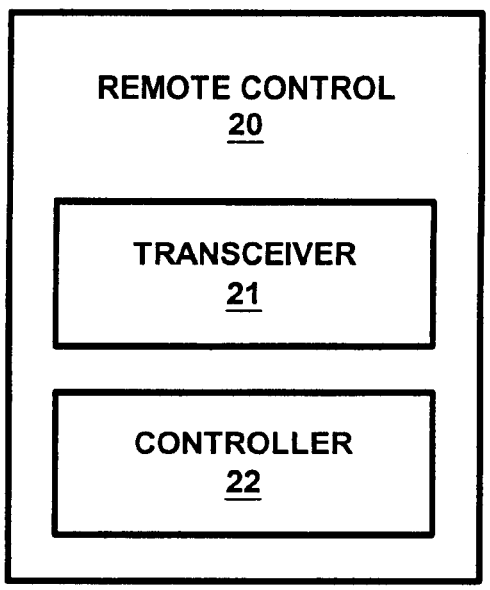
FIG. 1B is a block diagram of a remote control in accordance with one embodiment of the present invention.
Figure 1C:
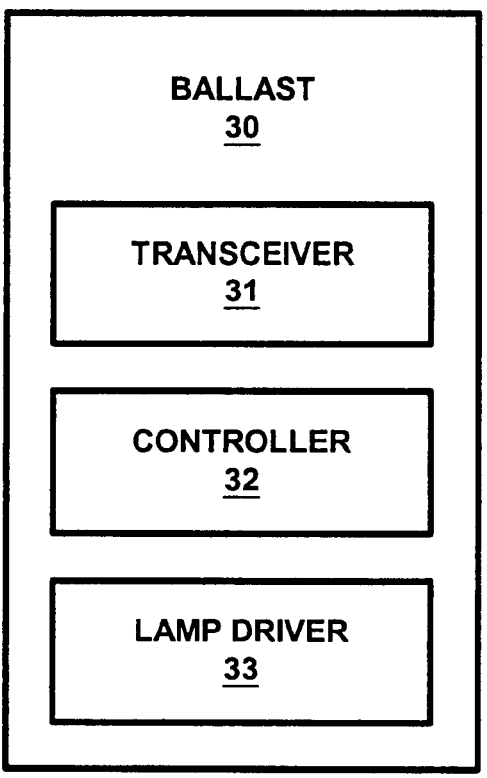
FIG. 1C is a block diagram of a ballast in accordance with one embodiment of the present invention.

Referring to FIGS. 1A–1C, a cell 15 containing a remote control 20, a ballast 30a, a ballast 30b, a ballast 30c, a ballast 30d, a ballast 30e, a ballast 30f, a ballast 30g, and a ballast 30h is shown in FIG. 1A. Cell 15 represents an area of ballasts 30a–30h intended to be operatively controlled by remote control 20, e.g., a room. In alternative embodiments, cell 15 can contain additional remote controls 20, and more or less ballasts 30.

After installation of ballasts 30a–30h within cell 15, a network address is assigned to each ballasts 30a–30h and each assigned network address is bound to a command of remote control 20 whereby a user of remote control 20 can selectively control ballasts 30a–30h.

As shown in FIG. 1B, remote control 20 includes a conventional transceiver 21, and a controller 22 in accordance with the present invention. Controller 22 is an electronic circuit comprised of one or more components that are assembled as a common unit. Controller 22 may be comprised of digital circuitry, analog circuitry, or both. Also, controller 22 may be programmable, a dedicated state machine, or a hybrid combination of programmable and dedicated hardware. To implement the principals of the present invention, controller 22 can further include any control clocks, interfaces, signal conditioners, filters, Analog-to-Digital (A/D) converters, Digital-to-Analog (D/A) converters, communication ports, or other types of operators as would occur to those having ordinary skill in the art.

Figure 11:
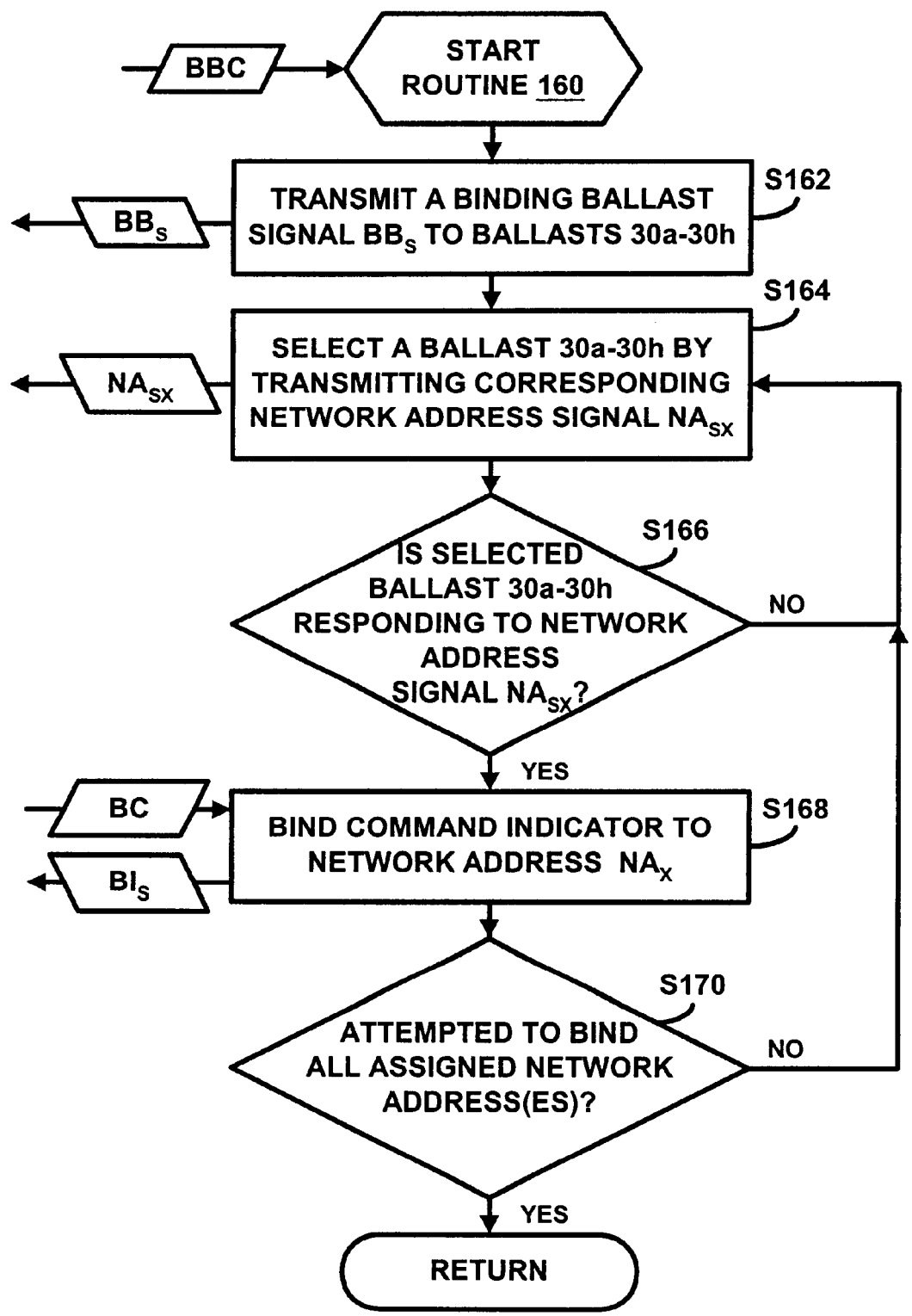
FIG. 11 is a flow chart of a master binding routine in accordance with one embodiment of the present invention.

In one embodiment, controller 22 includes an integrated processing unit (not shown) operatively coupled to one or more solid-state memory devices (not shown) and a control clock (not shown). The memory contains programming corresponding to an implementation of a master initialization routine 40 (FIG. 2) and a master binding routine 160 (FIG. 11), and arranged for reading and writing of data in accordance with the principals of the present invention. The memory may be either volatile or nonvolatile and may additionally or alternatively be of the magnetic or optical variety.

As shown in FIG. 1C, a ballast 30 representative of ballasts 30a–30h includes a conventional transceiver 31, a controller 32 in accordance with the present invention, and a conventional lamp driver 33. Controller 32 is an electronic circuit comprised of one or more components that are assembled as a common unit. Controller 32 may be comprised of digital circuitry, analog circuitry, or both. Also, controller 32 may be programmable, a dedicated state machine, or a hybrid combination of programmable and dedicated hardware. To implement the principals of the present invention, controller 32 can further include any control clocks, interfaces, signal conditioners, filters, Analog-to-Digital (A/D) converters, Digital-to-Analog (D/A) converters, communication ports, or other types of operators as would occur to those having ordinary skill in the art.

Figure 12:
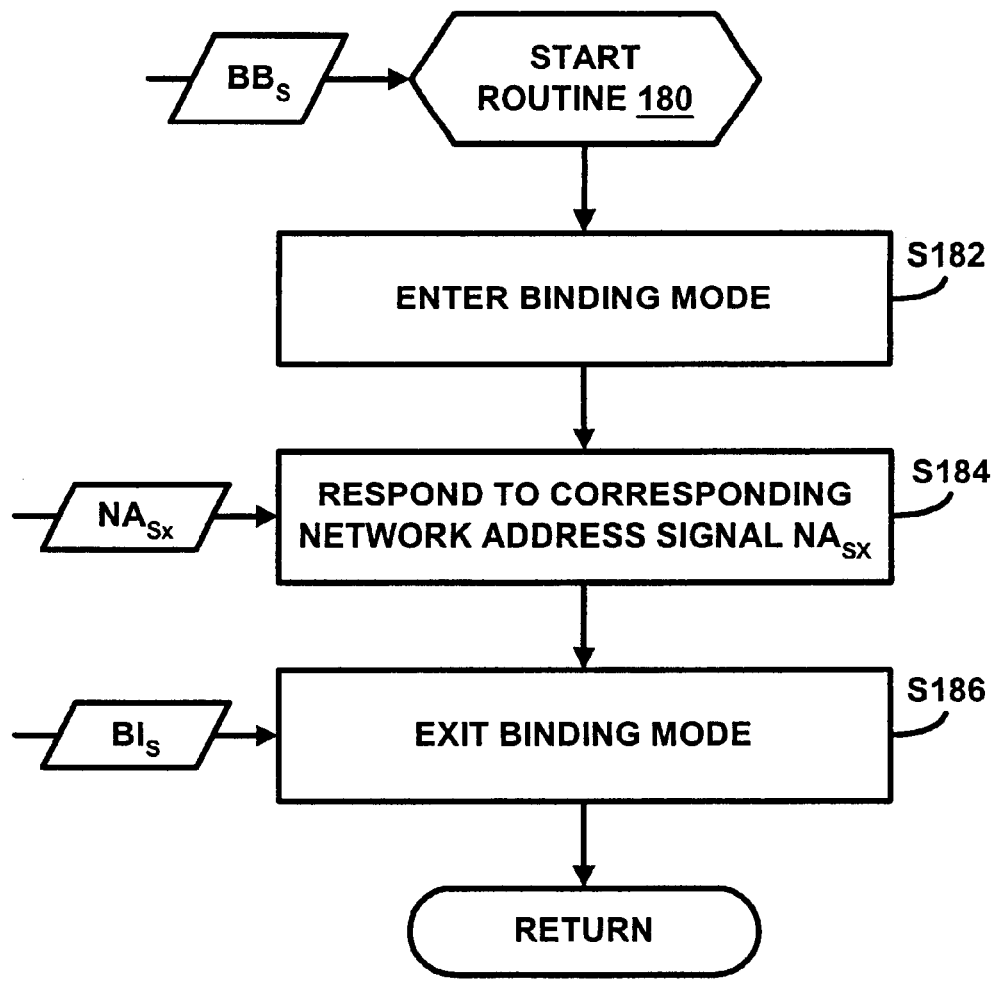
FIG. 12 is a flow chart of a slave binding routine in accordance with one embodiment of the present invention.

In one embodiment, controller 32 includes an integrated processing unit (not shown) operatively coupled to one or more solid-state memory devices (not shown) and a control clock (not shown). The memory contains programming corresponding to an implementation of a slave initialization routine 60 (FIG. 3) and a slave binding routine 180 (FIG. 12), and arranged for reading and writing of data in accordance with the principals of the present invention. The memory may be either volatile or nonvolatile and may additionally or alternatively be of the magnetic or optical variety.

Figure 2:
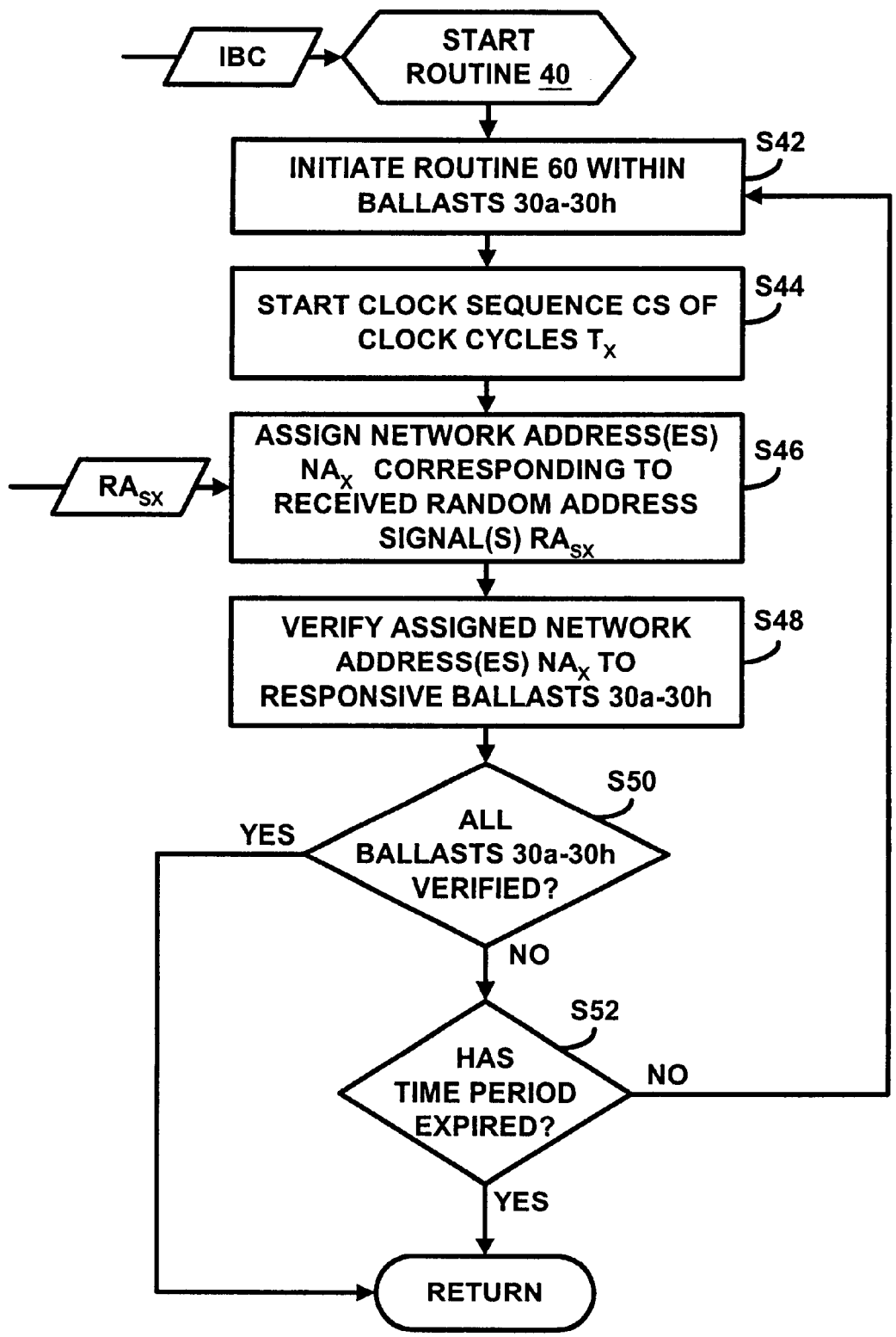
FIG. 2 is a flow chart of a master initialization routine in accordance with one embodiment of the present invention.
Figure 3:
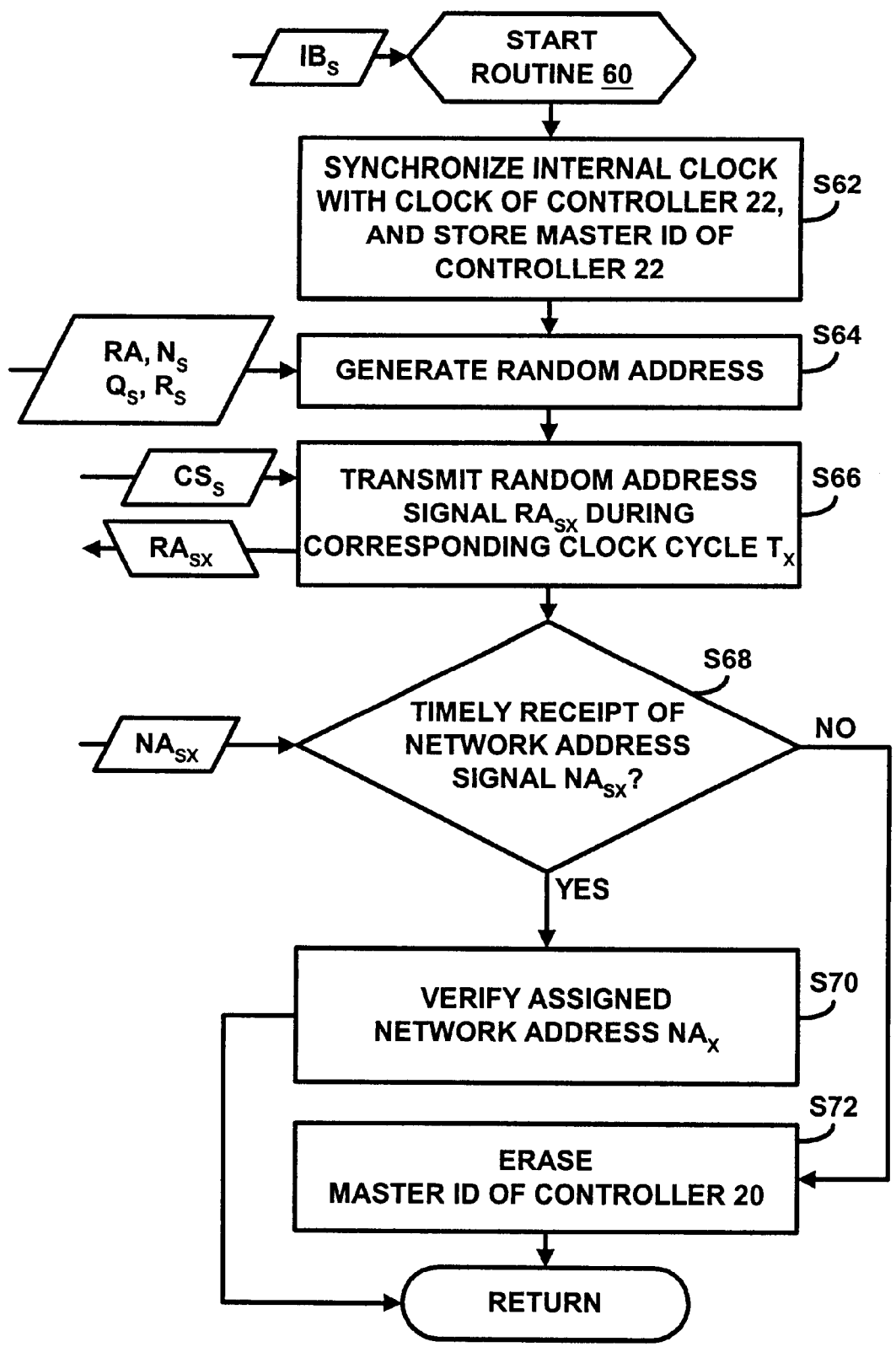
FIG. 3 is a flow chart of a slave initialization routine in accordance with one embodiment of the present invention.

Referring additionally to FIGS. 2 and 3, a master initialization routine 40 as implemented by controller 22 and a slave initialization routine 60 as implemented by controllers 32 of ballasts 30a–30h are shown, respectively. Controller 22 implements routine 40 in response to an initialize ballast command IBC from a user of remote control 20. In one embodiment, a user of remote control 20 presses a designated button or key on remote control 20 to provide the initialization ballast command IBC to controller 22. Controller 22 proceeds to a stage S42 of routine 40 upon receipt of the initialization ballast command IBC.

Figure 4:
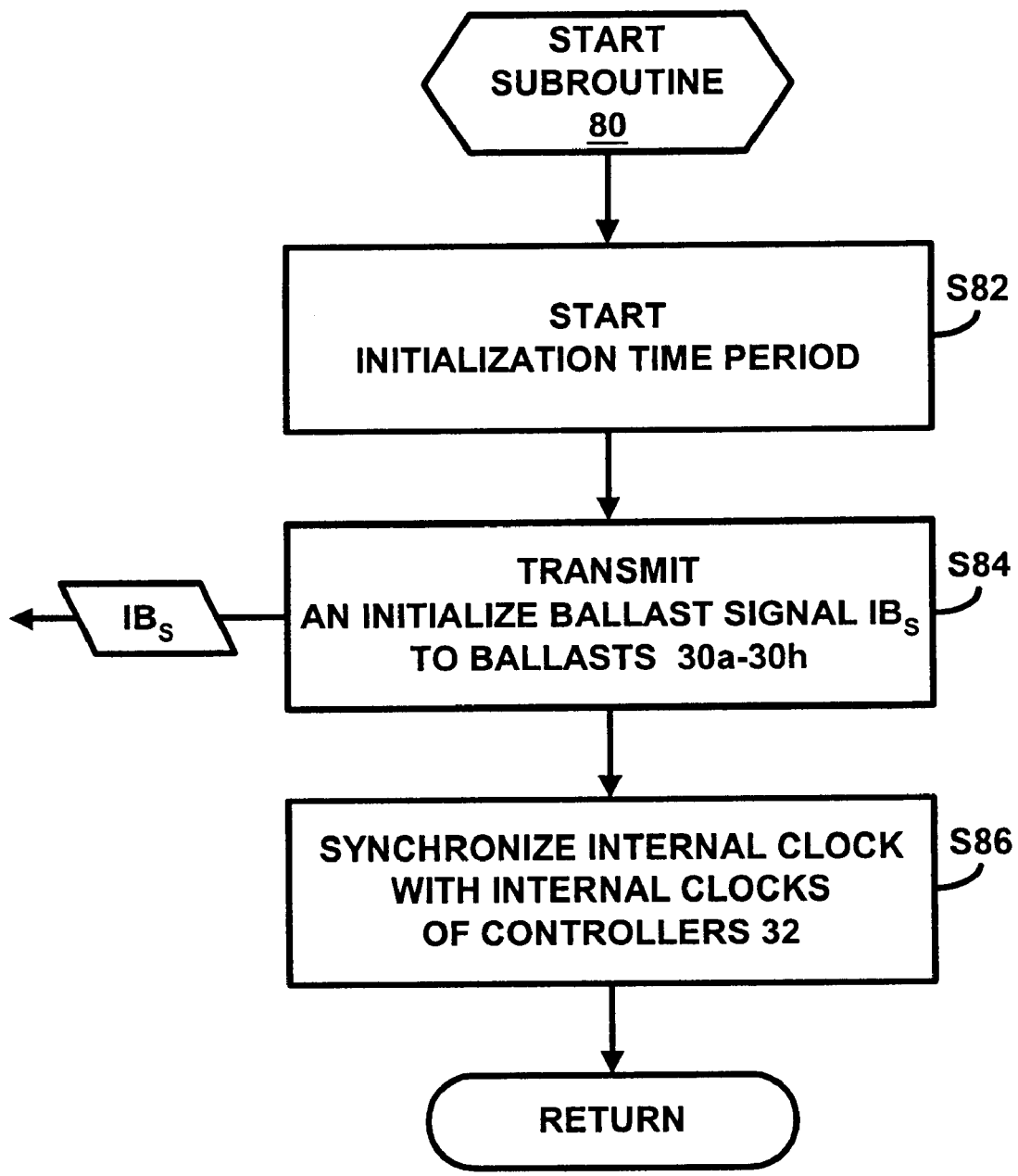
FIG. 4 is a flow chart of an initialization implementation subroutine of the FIG. 2 routine in accordance with one embodiment of the present invention.

During stage S42, controller 22 initiates an implementation of routine 60 by each controller 32 of ballasts 30a–30h. In one embodiment, controller 22 implements an initialization implementation subroutine 80 as shown in FIG. 4.

Referring to FIGS. 1A–1C and 4, during a stage S82 of subroutine 80, controller 22 starts an initialization time period for completing routine 40. In one embodiment, a Digital Addressable Lighting Interface (DALI) protocol of 15 minutes serves as the initialization time period.

Controller 22 thereafter proceeds to a stage S84 of subroutine 80 to direct a transmission of an initialize ballast signal $IB_S$ to controllers 32 of ballasts 30a–30h as an indication for each controller 32 to implement routine 60. In one embodiment, a DALI protocol is utilized with the initialize ballast signal $IB_S$ being INITIALIZE BALLAST. Additionally, a signal (not shown) indicating the initialization time period and a signal (not shown) indicating a master ID of controller 20 are transmitted to controllers 32 of ballasts 30a–30h.

Controller 22 thereafter proceeds to a stage S86 of subroutine 80 to synchronize the internal clock of controller 22 with the internal clocks of controllers 32 of ballast 30a–30h. Controller 22 terminates subroutine 80 upon completion of stage S86.

Referring to FIGS. 1A–1C and 3, controllers 32 of ballast 30a–30h proceed to a stage S62 of routine 60 upon receipt of initialize ballast signal $IB_S$. Stage S62 and stage S86 (FIG. 4) overlap whereby the internal clocks of each controller 32 of ballasts 30a–30h are synchronized with the internal clock of controller 22. Additionally, each controller 32 of ballasts 30a–30h stores a master ID (not shown) of controller 22 as indicated by a signal packaged with the initialize ballast signal $IB_S$. Those having ordinary skill in the art will appreciate various steps for synchronizing the internal clock of controller 22 and the internal clocks of controllers 32 of ballasts 30a–30h during stage S62 and stage S86.

Figure 5:
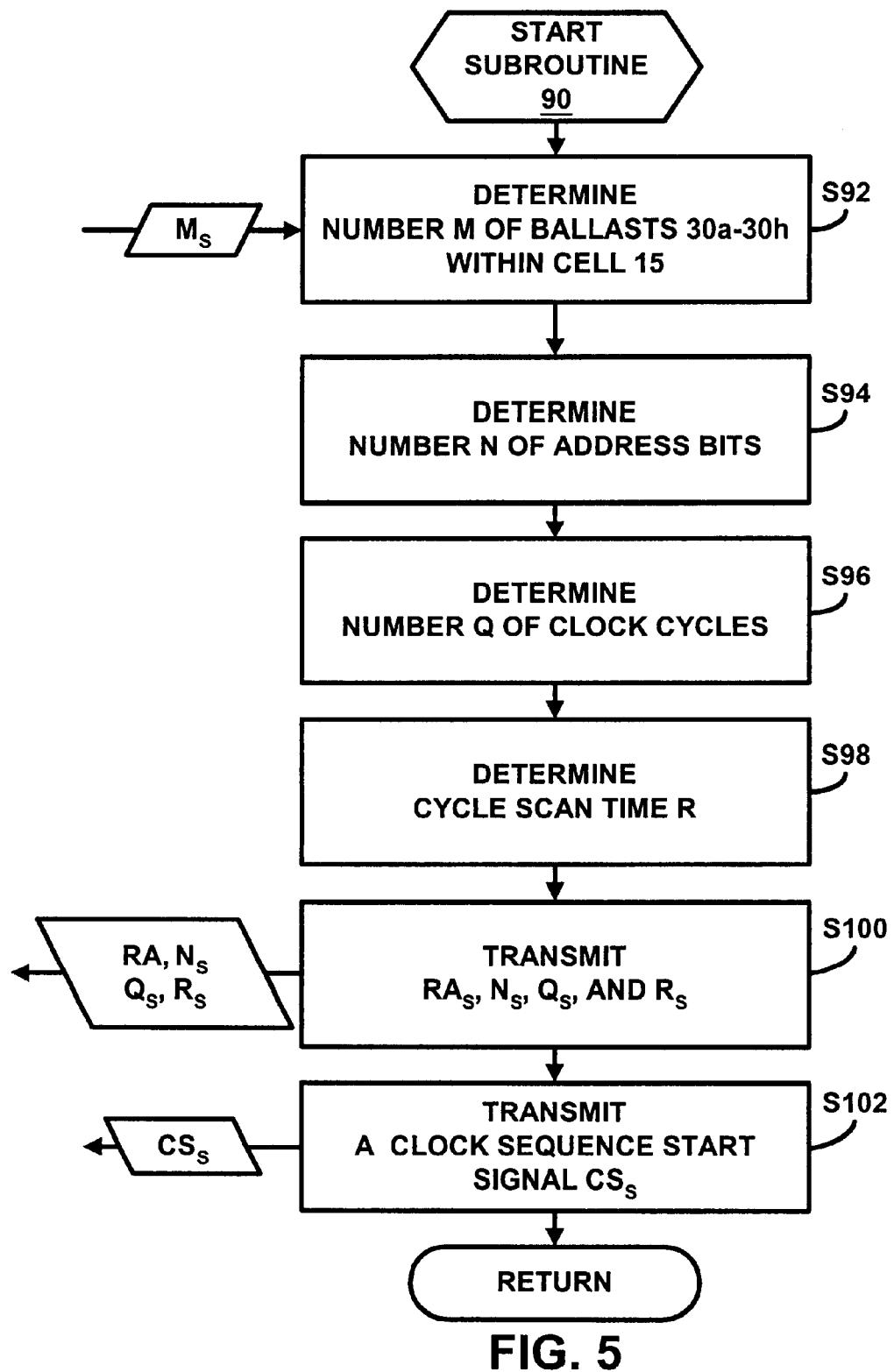
FIG. 5 is a flow chart of a clock sequence subroutine of the FIG. 2 routine in accordance with one embodiment of the present invention.

Referring to FIGS. 1A–1C and 2, during a stage S44 of routine 40, controller 22 starts a clock sequence CS of a plurality of clock cycles $T_x$ in a serial sequence. In one embodiment, controller 22 implements a clock sequence subroutine 90 shown in FIG. 5.

Referring to FIGS. 1A–1C and 5, during a stage S92 of subroutine 90, controller 22 determines a number M of ballasts 30a–30h within cell 15 to be initialized. In one embodiment, controller 22 prompts a user of remote control 20 for number M, and thereafter receives a ballast number signal Ms indicating 8 ballasts 30a–30h to be initialized when a user of remote control 20 enters 8 as number M into remote control 20. Those having ordinary skill in the art will appreciate that ballast number signal $M_S$ can be equal to or greater than 8 for an effective operation of routine 40.

Controller 22 thereafter proceeds to a stage S94 of subroutine 90 to determine a number N of address bits whereby there is an acceptable probability of each controller 32 of ballasts 30a–30h randomly generating a unique address. In one embodiment, controller 22 estimates address bits number N as a function of a probability of two or more ballasts 30a–30h randomly generating an identical address in accordance with the following equations (1) and (2):

$$\text{Probability } (N,M) = 1 - [P_M^{2^N}((2^N)^M)] \quad (1)$$

where $$P_M^{2^N} = (2^N)!/(2^N - M)! \quad (2)$$

In another embodiment, controller 22 estimates address bits number N as a function of a probability of at least half of ballasts 30a–30h randomly generating a unique address in accordance with the following equations (3) and (4):

$$\text{Probability } (N,M) = \{P_{M/2}^{2^N} * (2^N - (M/2))^{M/2}\}/(2^N)^M \quad (3)$$

Where $$P_{M/2}^{2^N} = (2^N)!/(2^N - (M/2))! \quad (4)$$

For the simplicity of the describing the present invention, routine 40 (FIG. 2) and routine 60 (FIG. 3) will be further described as if controller 22 determined address bits number N to be 8 during stage S94. However, those having ordinary skill in the art will appreciate that the present invention does not restrict the range of number N.

Controller 22 thereafter proceeds to a stage S96 of subroutine 90 to determine a number Q of total clock cycles $T_X$ during clock sequence CS. In one embodiment, the number Q of total clock cycles $T_X$ is computed from the following equation (5):

$$Q = 2^N \quad (5)$$

For the simplicity of the describing the present invention, routine 40 and routine 60 will be further described as if controller 22 determined total clock cycles Q during stage S96 to be 256 clock cycles $T_X$ based on address bits number N being 8. However, those having ordinary skill in the art will appreciate that the present invention does not restrict the range of number Q of total clock cycles $T_X$.

Controller 22 thereafter proceeds to a stage S98 of subroutine 90 to determine a cycle scan time R. In one embodiment, cycle scan time R is computed from the following equation (6):

$$R = 2 * (X/Y) \quad (6)$$

where X is the number of bits of a designated transmission signal protocol, and Y is a transmission/reception data rate of transceiver 21 and transceiver 31.

In one embodiment, controller 22 determines cycle scan time R during stage S98 as 1.68 milliseconds based upon X being 19 bits of a DALI protocol and Y being 22.5 kilobits per second. However, those having ordinary skill in the art will appreciate that the present invention does not restrict the range of cycle scan time R.

Controller 22 thereafter proceeds to a stage S100 of subroutine 90 to direct a transmission to controllers 32 of ballasts 30a–30h of a random address command RA, an address bits number signal $N_S$ indicating number N, a total clock cycles signal $Q_S$ indicating number Q, and a cycle scan time signal $R_S$ indicating cycle scan time R. In one embodiment, a DALI protocol is utilized with the random address command RA being RANDOMIZE.

Controller 22 thereafter proceeds to a stage S102 of subroutine 90 to direct a transmission of a clock sequence start signal $CS_S$ to controllers 32 of ballasts 30a–30h. Controller 22 terminates subroutine 90 upon completion of stage S102, and proceeds to stage S46 of routine 40 (FIG. 2).

Referring to FIGS. 1A–1C and 3, controllers 32 of ballast 30a–30h proceed to a stage S64 of routine 60 in response to randomize address command RA. During stage S64, each controller 32 of each ballast 30a–30h randomly generates an address of number N bits with a value between 0 and number P. For example, during stage S64, controller 32 of ballast 30a could generate a random address of 98 in hexadecimal form. Controller 32 of ballast 30b could generate a random address of 225 in hexadecimal form. Controller 32 of ballast 30c could generate a random address of 199 in hexadecimal form. Controller 32 of ballast 30d could generate a random address of 62 in hexadecimal form.

Controller 32 of ballast 30e could generate a random address of 248 in hexadecimal form. Controller 32 of ballast 30f could generate a random address of 121 in hexadecimal form. Controller 32 of ballast 30g could generate a random address of 43 in hexadecimal form. And, controller 32 of ballast 30h could generate a random address of 157 in hexadecimal form.

Controllers 32 of ballasts 30a–30h thereafter proceed to a stage S66 of routine 60 in response to clock sequence signal $CS_S$. Upon receipt of clock sequence signal $CS_S$ and based upon cycle scan time R as indicated by signal $R_S$, each controller 32 of ballasts 30a–30h directs a transmission of a random address signal $RA_{SX}$ to controller 20 during a clock cycle $T_X$ of clock sequence CS that corresponds to the random address generated during stage S64. In one embodiment, each random address signal $RA_{SX}$ indicates a "YES", e.g., only the last bit of each random address signal $RA_{SX}$ is set to a logic high.

Figures 7, 8:
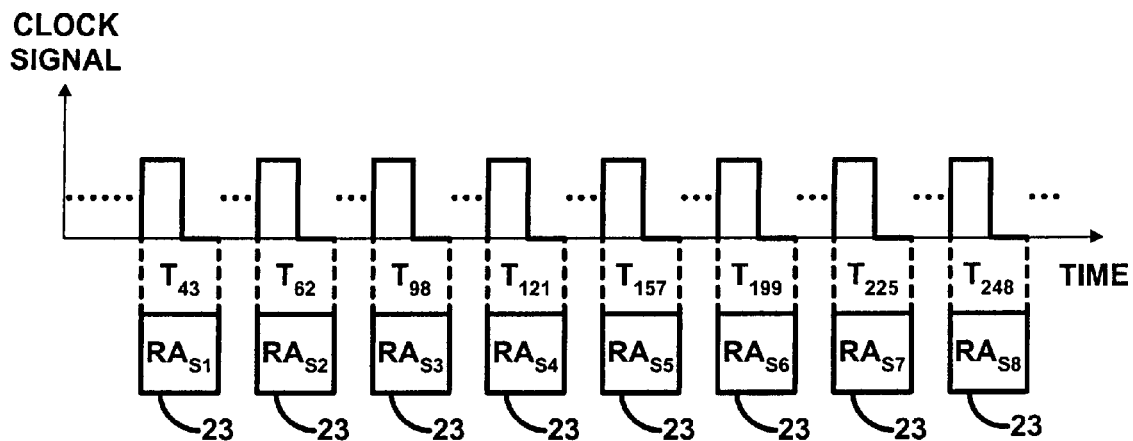
FIG. 7 is an exemplary initialization timing diagram of clock cycles and an input storage location of the FIG. 1B remote control in accordance with one embodiment of the present invention.
FIG. 8 is an exemplary mapping of random addresses and network addresses during an implementation of the FIG. 2 master initialization routine and the FIG. 3 slave initialization routine.

For example, as exemplary shown in FIG. 7, controller 32 of ballast 30g directs a transmission of a random address signal $RA_{S1}$ indicating a "YES" to a input storage location 23 of controller 22 during a clock cycle $T_{43}$. Controller 32 of ballast 30d directs a transmission of a random address signal $RA_{S2}$ indicating a "YES" to input storage location 23 during a clock cycle $T_{62}$. Controller 32 of ballast 30a directs a transmission of a random address signal $RA_{S3}$ indicating a "YES" to input storage location 23 during a clock cycle $T_{98}$. Controller 32 of ballast 30f directs a transmission of a random address signal $RA_{S4}$ indicating a "YES" to input storage location 23 during a clock cycle $T_{121}$.

Controller 32 of ballast 30h directs a transmission of a random address signal $RA_{S5}$ indicating a "YES" to input storage location 23 during a clock cycle $T_{157}$. Controller 32 of ballast 30c directs a transmission of a random address signal $RA_{S6}$ indicating a "YES" to input storage location 23 during a clock cycle $T_{199}$. Controller 32 of ballast 30b directs a transmission of a random address signal $RA_{S7}$ indicating a "YES" to input storage location 23 during a clock cycle $T_{225}$. Controller 32 of ballast 30e directs a transmission of a random address signal $RA_{S8}$ indicating a "YES" to input storage locution 23 during a clock cycle $T_{248}$.

Figure 6:
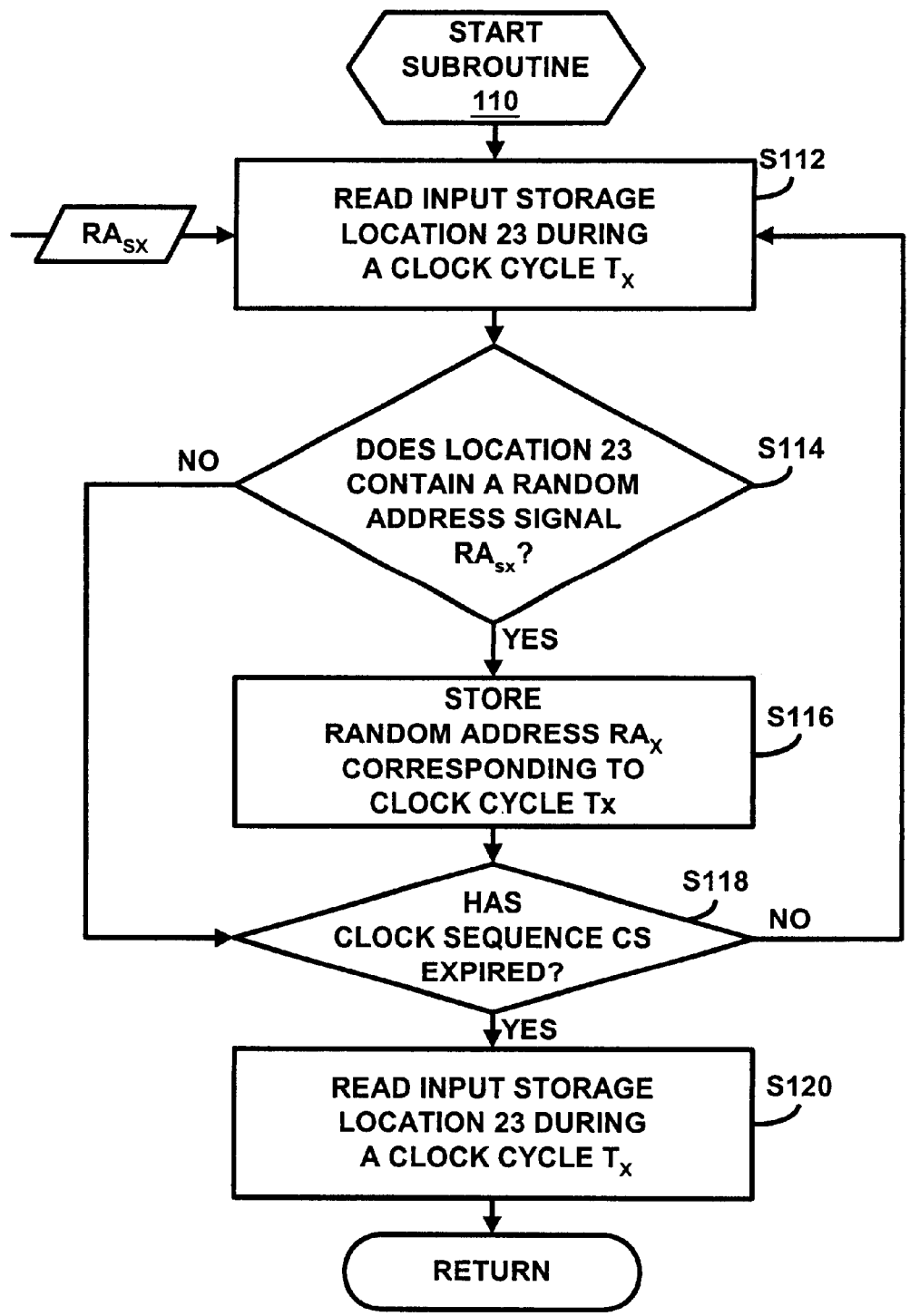
FIG. 6 is a flow chart of a network address assignment subroutine of the FIG. 2 routine in accordance with one embodiment of the present invention.

Referring to FIGS. 1A–1C and 2, during stage S46 of routine 40, controller 22 assigns network addresses $NA_X$ to each received random address signal $RA_{SX}$. In one embodiment, controller 22 implements an address assignment subroutine 110 as shown in FIG. 6. Subroutine 110 will be described as if controllers 32 of ballasts 30a–30h directed transmission of random addressing signals $RA_{S1}$–$RA_{S8}$ as shown in FIG. 7.

Referring to FIGS. 1A–1C, 6 and 7, during a stage S112 of subroutine 110, controller 22 initially reads input storage location 23 during clock cycle $T_1$. Controller 22 thereafter proceeds to a stage S114 of subroutine 110 to ascertain whether a random address signal $RA_{S1}$ is stored within location 23 during clock cycle $T_1$. Controller 22 proceeds to a stage S118 of subroutine 110, because random address signal $RA_{S1}$ is not stored within location 23 during clock cycle $T_1$.

During stage S118, controller 22 ascertains whether clock sequence CS has expired. Controller 22 proceeds to stage S112, because clock cycles $T_2$–$T_{256}$ of clock sequence CS have not been generated.

Those have ordinary skill in the art will appreciate that controller 22 repeats stage S112, stage S114 and stage S118 for clock cycles $T_2$–$T_{42}$. Upon clock cycle $T_{43}$, controller 22 reads random address signal $RA_{S1}$ in location 23 as shown in FIG. 7 during stage S112, and proceeds to stage S114 to ascertain that random address signal $RA_{S1}$ is in location 23. Controller 22 thereafter proceeds to a stage S116 of subroutine 110 to store random address 43 corresponding to clock cycle T43 within an address memory location A1 as shown in FIG. 8. Those having ordinary skill in the art will appreciate that controller 22 further implements stages S112–S118 with address locations A2–A8 storing random addresses as exemplary shown in FIG. 8. Specifically, address location A2 stores random address 62 corresponding to clock cycle T62. Address location A3 stores random address 98 corresponding to clock cycle T98. Address location A4 stores random address 121 corresponding to clock cycle T121. Address location A5 stores random address 157 corresponding to clock cycle $T_{157}$. Address location A6 stores random address 199 corresponding to clock cycle $T_{199}$. Address location A7 stores random address 225 corresponding to clock cycle $T_{225}$. And, address location A8 stores random address 248 corresponding to clock cycle $T_{248}$.

Controller 22 thereafter proceeds to a stage S120 of routine 110 to assign network addresses $NA_X$ to the stored random addresses from ballast 30a–30h. As exemplary shown in FIG. 8, networks addresses $NA_1$–$NA_8$ are assigned to the random addresses as stored in address locations A1–A8.

Referring to FIGS. 1A–1C, 3 and 6, it is possible for two or more controllers 32 of ballasts 30a–30h to generate identical random addresses during stage S64, and consequently, to direct concurrent transmissions of multiple random address signals $RA_{SX}$ during the same clock cycle $T_X$. When this occurs, controller 22 hears noise within input location 23 during stage S112 for the clock cycle $T_X$ having the transmission conflict. To resolve this transmission conflict, in one embodiment, controller 22 ignores the noise and will implement routine 40 for a second time after an initial completion of routine 40 to initialize the two or more ballasts 30a–30h experiencing the transmission conflict as will be subsequently described herein. Also, controllers 32 of ballast 30a–30h involved in the conflict will sequentially proceed to a stage S68 and a stage S72 of routine 60 as will be subsequently described herein.

In another embodiment, controllers 32 of ballast 30a–30h utilize a Carrier Sense Multiple Access (CSMA) technique whereby each controller 32 of ballasts 30a–30h senses the transmission channel during a clock cycle $T_X$ corresponding to the generated random address to determine if one of the other controllers 32 is currently sending a random address signal $RA_{SX}$. If the transmission channel is open during a clock cycle $T_X$ corresponding to random address signal $RA_{SX}$, then a controller 32 directs a transmission of the random address signal $RA_{SX}$ during the clock cycle $T_X$. If the transmission channel is not open during a corresponding clock cycle $T_X$, then a controller 32 sequentially proceed to a stage S68 and a stage S72 of routine 60 as will be subsequently described herein.

Figure 9:
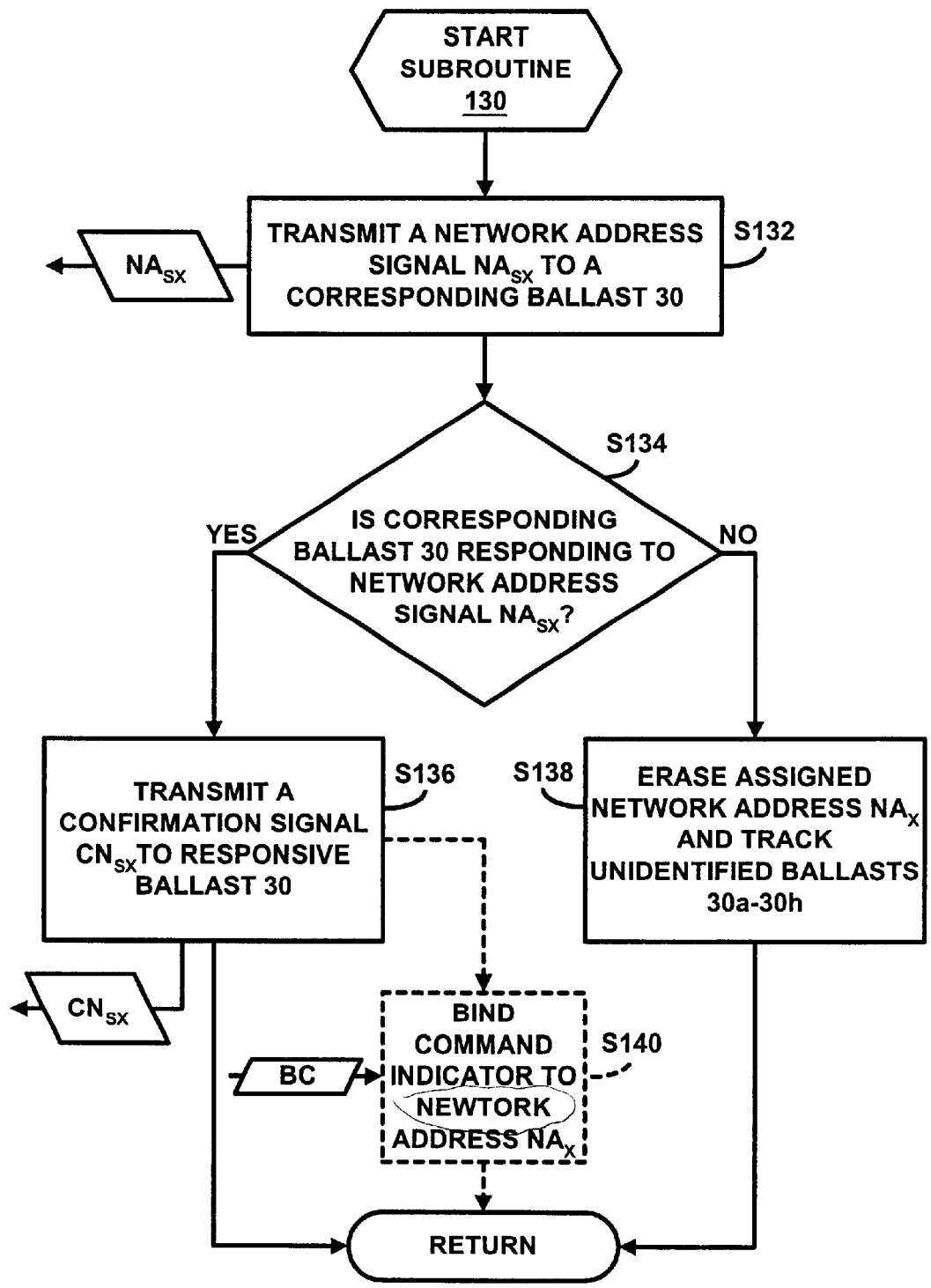
FIG. 9 is a flow chart of a master address verification subroutine of the FIG. 2 routine in accordance with one embodiment of the present invention.

Referring to FIGS. 1A–1C, and 2, controller 22 proceeds to a stage S48 of routine 40 upon a completion of stage S46. During stage S48, controller 22 verifies assigned network addresses $NA_X$ to controllers 32 of ballasts 30a–30h. In one embodiment, controller 22 implements a master address verification subroutine 130 as shown in FIG. 9. Subroutine 130 will be described with assigned network addresses $NA_1$–$NA_8$ as shown in shown in FIG. 8.

Referring to FIGS. 1A–1C, 3, 8, and 9, during a stage S132 of subroutine 130, controller 22 directs a transmission of a network address signal $NA_{S1}$ indicating network address signal $NA_1$ to the controller 32 of ballast 30g. Controller 22 thereafter proceeds to a stage S134 of subroutine 130 to ascertain whether ballast 30g is responding to network address signal $NA_{S1}$. In one embodiment, controller 22 determines the ballast 30g is responding to network address signal $NA_{S1}$ in response to a responsive input indicating "YES" from a user of remote control 20.

During a stage S68 of routine 60, controller 32 of ballast 30g ascertains whether network address signal $NA_{S1}$ was received within the initialization time period. If controller 32 of ballast 30g does nor receive the network address signal $NA_{S1}$ within the initialization time period, controller 32 of ballast 30g proceeds to a stage S72 to erase a master ID of controller 20 and then terminates routine 60.

If controller 32 of ballast 30g does receive the network address signal $NA_{S1}$ within the initialization time period, then controller 32 of ballast 30g proceeds to a stage S70 of routine 60 to verify the assigned network address $NA_1$. In one embodiment, controller 32 of ballast 30g implements a slave address verification subroutine 150 as shown in FIG. 10.

Figure 10:
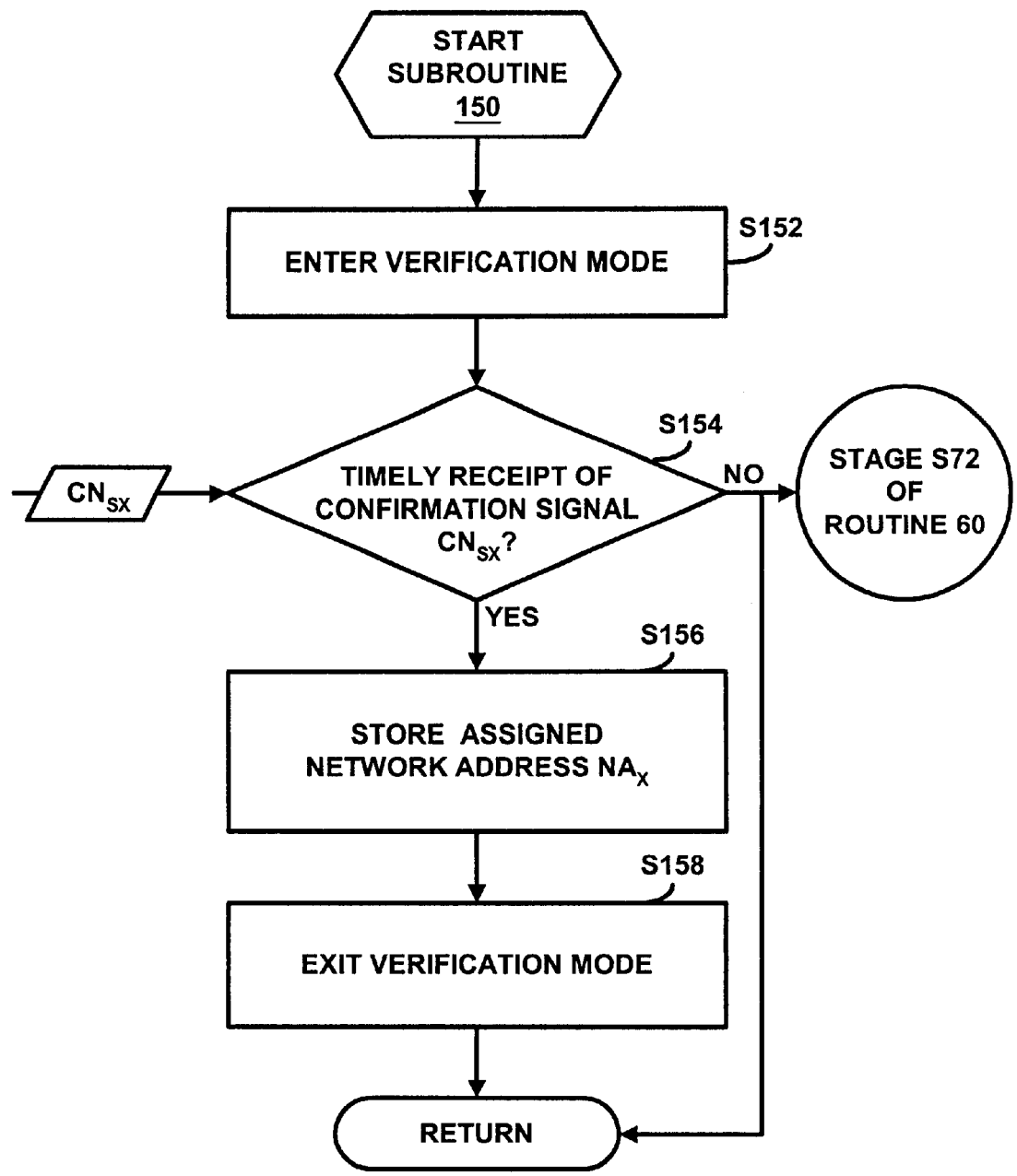
FIG. 10 is a flow chart of a slave address verification subroutine of the FIG. 3 routine in accordance with one embodiment of the present invention.

Referring additionally to FIG. 10, during a stage S152 of routine 150, controller 32 of ballast 30g enters a verification mode to provide a responsive indication to the user of remote control 20. In one embodiment, controller 32 of ballast 30g cyclically transitions an associated lamp driver 33 between a full operational state and an inactive operational state whereby the fixture or the lamp housing ballast 30g flashes. In another embodiment, controller 32 of ballast 30g activates the associated lamp driver 33 to a full power state upon initiating stage S68 of routine 60 whereby the fixture or lamp is fully lit. Controller 32 of ballast 30g thereafter activates the associated lamp driver 33 to a partial power state during stage S152 whereby the fixture or lamp housing ballast 30g is dimmed. Assuming every component of ballasts 30g is operating properly, controller 22 determines ballast 30g is responding to network address signal $NA_{S1}$ as indicated by the responsive input from the user of remote control 20, and thereafter proceeds to a stage S136 of subroutine 130. During stage S136, controller 22 directs a transmission of a confirmation signal $CN_{S1}$ to the controller 32 of ballast 30g.

During a stage S154 of subroutine 150, controller 32 of ballast 30g ascertains whether confirmation address signal $CN_{S1}$ has been received within the initialization time period. If confirmation address signal $CN_{S1}$ was not received within the initialization time period, controller 32 of ballast 30g proceeds to stage S72 of routine 60 to thereby erase the master ID of controller 22 and terminates subroutine 150.

If confirmation address signal $CN_{S1}$ was received within the initialization time period, then controller 32 of ballast 30g sequentially proceeds to a stage S156 of subroutine 150 to store the assigned network address of $NA_1$ and a stage S158 of subroutine 150 to exit the verification mode.

Subroutine 130 includes an optional binding stage S140. During optional stage S140, controller 22 binds network address $NA_1$ to a command indicator of remote control 20, e.g., a button or key, in response to a binding command BC from a user of remote control 20 within the initialization period. Controller 22 thereafter terminates subroutine 130.

Those having ordinary skill in the art will appreciate that controller 22 implements subroutine 130 for the other ballasts 30a–30f, and 30h in the same manner as described herein for ballast 30g. Those having ordinary skill in the art will also appreciate that ballasts 30a–30f, and 30h implement subroutine 150 in the same manner as described herein for ballast 30g.

Referring to FIGS. 1A–1C, 2–5 and 9, a rescan feature of the present invention will now be described herein. The rescan feature is the ability of controller 22 to perform a subsequent implementation of stages S42–S48 of routine 40 when a network address $NA_X$ was not verified for one or more ballasts 30a–30h during an initial implementation of stage S48 of routine 40.

Specifically, when controller 22 determines that a ballast 30a–30h is not responding to a corresponding network address signal $NA_{SX}$ during stage S134 of subroutine 130, controller 22 proceeds to a stage S138 of subroutine 130 to erase the store assigned network address $NA_X$ associated with network address signal $NA_{SX}$, and adds one to a count of unidentified ballasts 30a–30h. Controller 22 thereafter terminates subroutine 130. Upon an implementation of subroutine 130 for each assigned network address $NA_X$, controller 22 proceeds to a stage S50 of routine 40 to ascertain if all ballasts 30a–30h have been verified. In one embodiment, controller 22 compares the number M of ballasts 30a–30b determined during stage S92 of subroutine 90 to the number of unidentified ballasts 30a–30h counted during each implementation of stage S138 of subroutine 130. Controller 22 thereafter proceeds to terminate routine 40 when all ballasts 30a–30h have been verified, or proceeds to a stage S52 of routine 40 to ascertain whether the initialization time period has expired when all ballasts 30a–30h have not been verified. From stage S52, controller 22 proceeds to terminate routine 40 when the initialization time period has expired, or re-proceeds to stage S42 to initialize the unidentified ballasts 30a–30h.

When returning to stage S42, controller 22 implements subroutine 80 as previously described herein in connection with FIG. 4 except for stage S82. Each controller 32 of unidentified ballasts 30a–30h will again implement routine 60 in response to initialize ballast signal $IB_S$ while each controller 32 of verified and/or bound ballasts 30a–30h will ignore initialize ballast signal $IB_S$. Controller 22 thereafter proceeds to stage S44 to implement subroutine 90 as previously described herein in connection with FIG. 5, except, during stage S92 of routine 90, controller 22 now determines number M to be equal to the number of unidentified ballasts 30a–30h. Those having ordinary skill in the art will appreciate that controller 22 will cyclically implement routine 40 until either all ballast 30a–30h are verified, or the initialization time period expires.

Referring to FIGS. 1A–1C, 11 and 12, when optional stage S140 is omitted from subroutine 130 (FIG. 9), a master binding routine 160 and a slave binding routine 180 as subsequently described herein are utilized to bind each network addresses $NA_X$ of each verified ballasts 30a–30h during an implementation of routine 40 (FIG. 2) and routine 60 (FIG. 3).

Controller 22 implements routine 160 in response to a bind ballast command BBC from a user of remote control 20. In one embodiment, a user of remote control 20 presses a designated button or key on remote control 20 to provide the bind ballast command BBC to controller 22. Controller 22 proceeds to a stage S162 of routine 160 upon receipt of the bind ballast command BBC.

During stage S162, controller 22 initiates an implementation of routine 180 by each controller 32 of ballasts 30a–30h by directing a transmission of a binding ballast signal BBS to each controller 32 of ballasts 30a–30h as an indication for each controller 32 to implement routine 180. In one embodiment, a DALI protocol is utilized with the binding ballast signal $BB_S$ being BIND BALLAST.

Upon receipt of binding ballast signal BBS, controllers 32 of ballast 30a–30h proceed to a stage S182 of routine 180 to enter a binding mode. In one embodiment, controllers 32 of ballasts 30a–30h operate associated lamp drivers 33 to a full power state whereby the fixture and lamp housing ballasts 30a–30h are fully lit during stage S182.

Controllers 32 of ballasts 30a–30h thereafter proceed to a stage S184 of routine 180 to await a network address signal $NA_{SX}$ corresponding to an assigned and stored network address $NA_X$. For example, as related to the mapping shown in FIG. 8, controller 32 of ballast 30g awaits network address signal $NA_{S1}$ from controller 22 during stage S182. Controller 32 of ballast 30d awaits network address signal $NA_{S2}$ from controller 22 during stage S182. Controller 32 of ballast 30a awaits network address signal $NA_{S3}$ from controller 22 during stage S182. Controller 32 of ballast 30f awaits network address signal $NA_{S4}$ from controller 22 during stage S182. Controller 32 of ballast 30h awaits network address signal $NA_{S5}$ from controller 22 during stage S182. Controller 32 of ballast 30c awaits network address signal $NA_{S6}$ from controller 22 during stage S182. Controller 32 of ballast 30b awaits network address signal $NA_{S7}$ from controller 22 during stage S182. And, controller 32 of ballast2 30e awaits network address signal $NA_{S8}$ from controller 22 during stage S182.

Controller 22 cycles through a stage S164, a stage S166, a stage S168 and a stage S170 of routine 160 for each verified ballasts 30a–30h. For simplicity in describing the present invention, stages S164–170 of routine 160 as well as a stage S186 of routine 180 will be now be described herein in connection with a controller 32 of ballast 30g.

During stage S164, controller 22 directs a transmission of a network address signal $NA_{S1}$ to controller 32 of ballast 30g. Controller 32 of ballast 30g responds to a receipt of the network address signal $NA_{S1}$ during stage S184. In one embodiment, controller 32 of ballast 30g cyclically operates an associated lamp driver 33 between a full power state and a partial power state whereby the fixture and lamp housing ballast 30g flashes. In another embodiment, controller 32 of ballast 30g operates an associated lamp driver 33 to a partial power state whereby the fixture and lamp housing ballast 30g is dimmed.

After directing the transmission of network address signal $NA_{S1}$ to controller 32 of ballast 30g stage S164, controller 22 proceeds to a stage S166 to ascertain whether ballast 30g is responding to network address signal $NA_{S1}$. In one embodiment, controller 22 determines ballast 30g is responding to network address signal $NA_{S1}$ in response to a responsive input "YES" from a user of remote control 20. Assuming controller 32 of ballast 30g received network address signal $NA_{S1}$ whereby a user of remote control 20 provided a responsive input to controller 22, controller 22 proceeds to a stage S168 to bind a command indicator of remote control 20 to network address $NA_1$ in response to a binding command BC from a user of remote control 20. Controller 22 additionally directs a transmission of a bound indicator signal $B1_S$ as an indication to controller 32 of ballast 30g that a command indicator of remote control 20 is bound to network address $NA_1$.

During a stage S186 of routine 180, controller 32 of ballast 30g exits the binding mode in response to bound indicator signal $BI_S$. In one embodiment, controller 32 of ballast 30g operates an associated lamp driver 33 to an inactive state whereby the fixture and lamp housing ballast 30g is turned off during stage S186. Controller 32 of ballast 30g thereafter terminates routine 180.

Controller 22 thereafter proceeds to stage S170 to determine if a binding attempt was made from each assigned network address $NA_X$ for verified ballasts 30a–30h. Having only bound a command indicator to network address signal $NA_{S1}$, controller 22 proceeds to stage S164 to implement stages S164–S170 for ballasts 30a–30f, and 30h in the same manner as described herein for controller 32 of ballast 30g. Those having ordinary skill in the art will appreciate that controllers 32 of ballasts 30a–30f, and 30h will implement stages S184 and S186 in the same manner as described herein for controller 32 of ballast 30g. An exemplary mapping of network addresses $NA_X$ and bound commands after a completion of routine 160 by controller 22 and a completion of routine 180 by each controller 32 of ballasts 30a–30g is shown in FIG. 13.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. An operating method of a remote control for assigning addresses to a plurality of wireless-controlled lighting circuits, said method comprising:

transmitting a first signal to the lighting circuits, said first signal being indicative of a start of a clock sequence including a plurality of clock cycles, said lighting circuits being associated with respective ones of said clock cycles; and assigning addresses to the lighting circuits in response to a receipt of signals from the lighting circuits associated with said respective ones of said clock cycles.

2. The method of claim 1 where the lighting circuits have generated addresses that are associated with respective ones of the clock cycles.

3. The method of claim 1 where the lighting circuits themselves generate the addresses that are associated with respective ones of the clock cycles.

4. An operating method of at least one of a plurality of wireless-controlled lighting circuits for receiving an assignment of address, said method comprising:

associating the at least one lighting circuit with a respective one of a sequence of clock cycles; and transmitting a signal indicative of the respective clock cycle with which said at least one lighting circuit is associated.

5. The method of claim 4 where the lighting circuits have generated addresses that are associated with respective ones of the clock cycles.

6. The method of claim 4 where the lighting circuits themselves generate the addresses that are associated with respective ones of the clock cycles.

7. A method for operating a remote control and a plurality of wireless-controlled lighting circuits, said method comprising:

associating the lighting circuits with respective ones of a sequence of clock cycles;

operating the remote control to transmit a signal indicative of a start of said sequence of clock cycles;

operating the lighting circuits to transmit a signals to the remote control indicating which of said clock cycles have been associated with respective ones of the lighting circuits; and operating the remote control to assign respective addresses to the lighting circuits associated with said clock cycles.

8. The method of claim 7 where the lighting circuits have generated addresses that are associated with respective ones of the clock cycles.

9. The method of claim 7 where the lighting circuits themselves generate the addresses that are associated with respective ones of the clock cycles.

10. A computer readable medium including a computer program for assigning addresses to a plurality of wireless-controlled lighting circuits associated with respective ones of a sequence of clock cycles, said computer program comprising:

a first computer readable code for generating the sequence of clock cycles; and a second computer readable code for assigning the addresses to the lighting circuits in response to signals received from said lighting circuits indicating the respective clock cycles with which they are associated.

11. The computer readable medium of claim 10 where the lighting circuits have generated addresses that are associated with respective ones of the clock cycles.

12. The computer readable medium of claim 10 where the lighting circuits themselves generate the addresses that are associated with respective ones of the clock cycles.

13. A system, comprising:

a plurality of wireless-controlled lighting circuits for association with respective ones of a sequence of clock cycles, said lighting circuits being operable to transmit signals indicative of the clock cycles with which they are associated; and a remote control operable to assign addresses to the lighting circuits in response to a reception of said signals.

14. The system of claim 13 where the lighting circuits have generated addresses that are associated with respective ones of the clock cycles.

15. The system of claim 13 where the lighting circuits themselves generate the addresses that are associated with respective ones of the clock cycles.

* * * * *